UNITED STATES PATENT OFFICE.

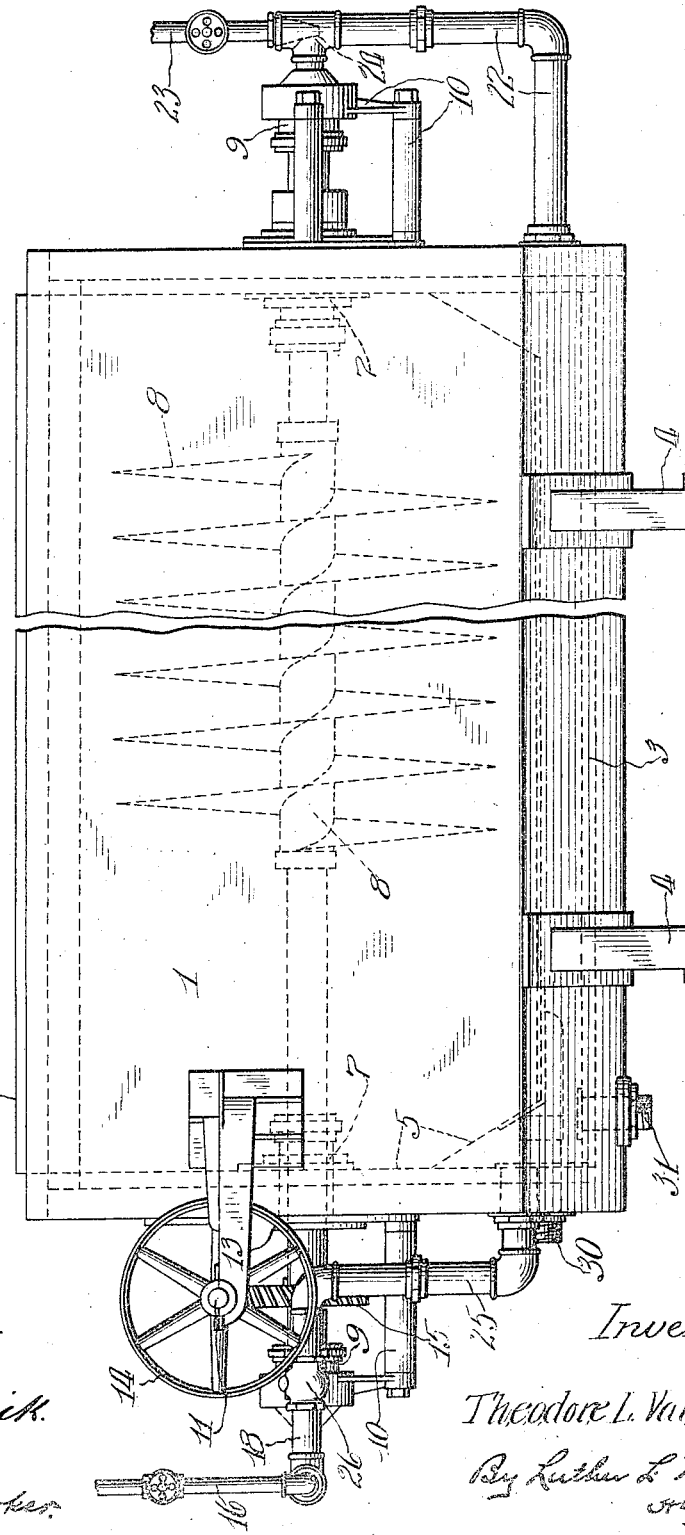

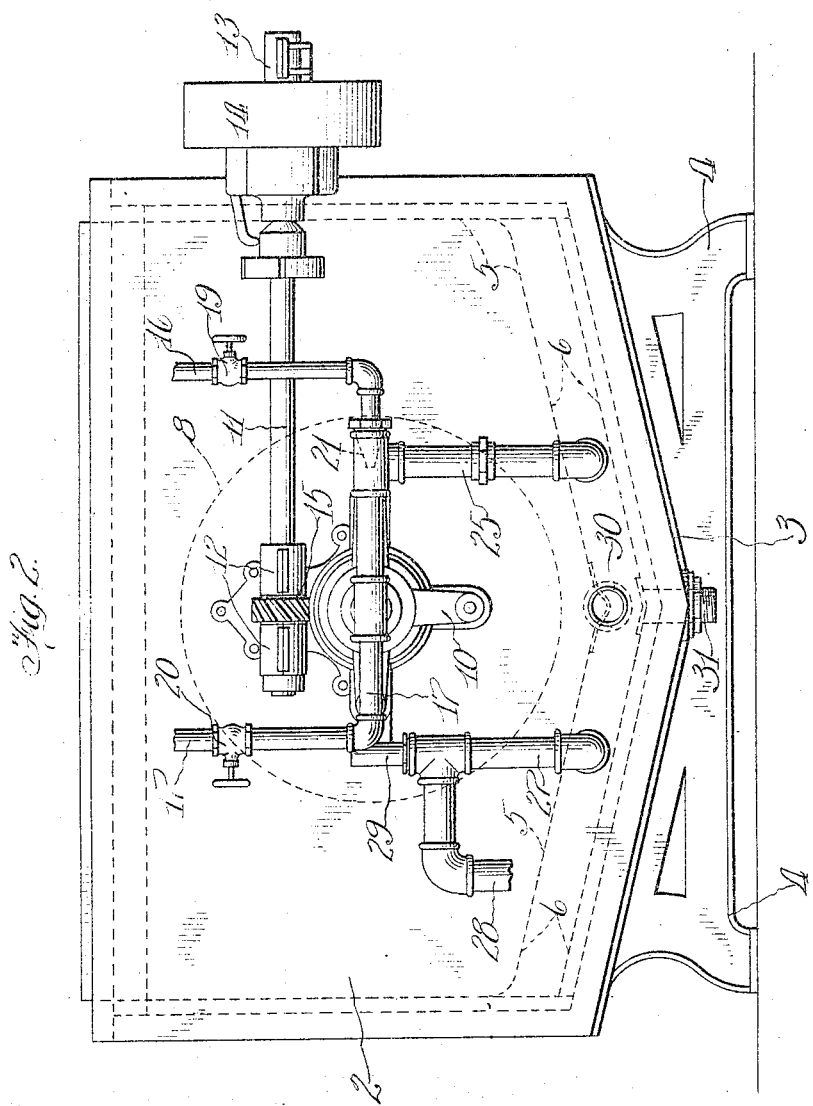

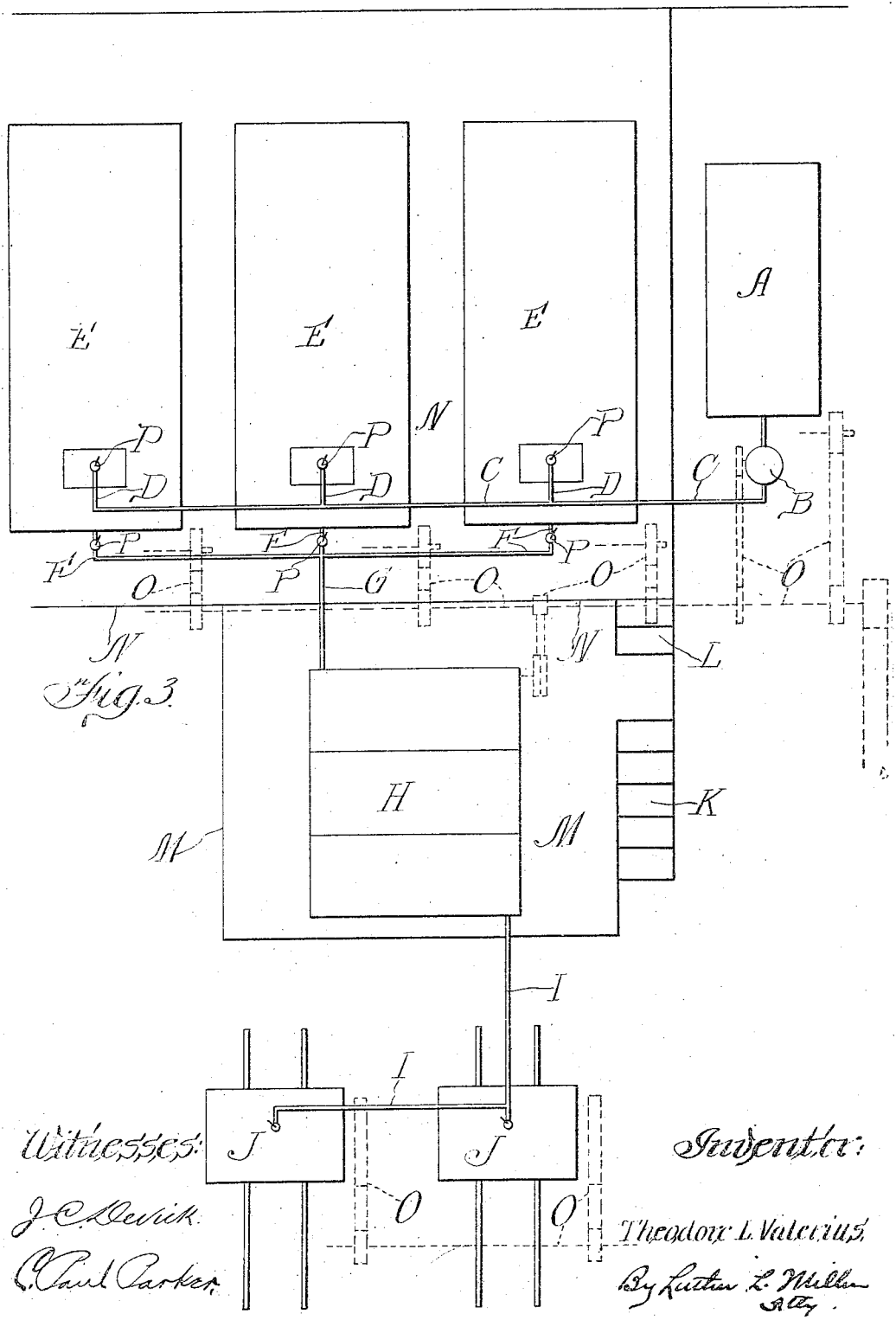

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

APPARATUS FOR TREATING MILK OR CREAM.

1,210,729.  Specification of Letters Patent.  Patented Jan. 2, 1917.

Application filed April 14, 1911. Serial No. 620,987.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Apparatus for Treating Milk or Cream, of which the following is a specification.

One of the objects of this invention is to provide an improved machine for heating batches of milk or cream to a pasteurizing temperature and holding the milk at such temperature a sufficient length of time to destroy all bacteria therein. The temperature at which I prefer to hold the milk is about 140° Fahr., the milk being held at this point for approximately twenty minutes. It has been found that this temperature maintained for the time specified is sufficient to destroy all bacteria, and that this treatment of the milk will not coagulate the albumin therein or destroy the cream line, or tendency of the butter fat to rise in the milk, the latter having every quality of fresh cow's milk as regards taste and at the same time being much more healthful on account of the elimination of the harmful bacteria, and also having the quality of keeping for a greater length of time without souring.
Another object of my invention is to produce a machine which may be operated by itself to heat, hold and cool the milk, thus entirely dispensing with a separate cooler, the milk being delivered directly from the machine to a bottle filler and capper; or, which may, if desired, be operated in connection with one or more similar machines so that a continuous cooler of any of the standard types now upon the market may be continuously supplied from one of the pasteurizers of the series without interruption, or intermittently at intervals of the desired length.

The machine may further be used, in the case of an accident to a cooler, as a storage tank for the milk, the milk being held in the machine and maintained at a low temperature for storage.

A further object of the invention is to produce a pasteurizing machine equipped with heating means which entirely eliminates the liability to burning or scorching the milk solids. This object I accomplish by causing a circulation of heated fluid through and about the tank, the fluid being heated by steam injected thereinto and before it comes in contact with the wall of the milk tank. In this way live steam is prevented at all times from coming into direct contact with the milk receptacle.

My invention further relates to a machine of the character described which may be very easily cleaned and which may be thoroughly sterilized by steam admitted to the heating passages, so that the entire interior of the tank may be raised to and maintained at a temperature sufficient to thoroughly sterilize the tank previous to placing the milk therein.

Referring to the accompanying drawings, in which I have illustrated the preferred form of my invention, Figure 1 is a side elevation with parts broken out, showing a machine embodying the features of my invention. Fig. 2 is an elevation of the forward or head end of the machine. Fig. 3 is a diagrammatic view showing the combination of three machines in such relation that the apparatus may supply milk to a continuous cooler without interruption.

In the form herein illustrated, the machine comprises a vat of suitable form and dimensions, said vat comprising side walls 1, end walls 2, and a trough-like bottom 3, and being supported upon suitable legs 4. The top of the vat is open and the upper edge is preferably constructed to receive a cover such as is illustrated in my prior Patent No. 790,466, issued May 23, 1905, so as to provide a water-seal between the vat and its cover. I have deemed it unnecessary to show this construction herein.

The vat is preferably made of heavy wood and has a suitable insulating lining in its interior, within which lining fits the milk tank 5. The bottom wall of this tank is spaced some distance above the bottom 3 of the vat to provide a jacket or space 6 for circulation of the tempering fluid.

Rotatably mounted in suitable bearings 7 in the end walls 2 of the vat is a tempering spiral 8 which may be of any suitable construction such as those shown in my Patents Nos. 790,466 and 933,934. The outer ends of the hollow shaft of this tempering member extend into stuffing boxes 9 carried by brackets 10 mounted upon the end walls 2 of the vat, said stuffing boxes preventing leakage between said spiral and the tempering fluid pipes to be presently described.

The tempering spiral 8 may be rotated by suitable means such as a shaft 11 mounted in bearings 12 upon the bracket 10 and in a bearing bracket 13, said shaft having a drive pulley 14 thereon and being connected with the tempering member by intermeshing spiral gears 15.

A steam supply pipe 16 and a water supply pipe 17 are connected through a pipe 18 with the interior of the rotary spiral 8, the pipe 18 extending into the stuffing box 9 at the head end of the machine.

19 and 20 are controlling valves in the steam pipe 16 and water pipe 17, respectively. A steam jet or injector 21 in the steam supply pipe 16 is arranged to discharge steam into the water in the pipe 17 to heat said water and assist to force the water through the rotary tempering member, the rotation of said tempering member, due to its spiral formation having a suction or pumping action upon the water to further assist in drawing the same through said tempering member. Flowing from the right-hand end (Fig. 1) of the member 8, the water is conducted through a pipe 22 to the adjacent end of the water jacket 6. Steam from a supply pipe 23 is injected through a muffler or injector 24 into the pipe 22 for the purpose of further heating the water therein and increasing the speed of circulation.

The water flowing from the jacket 6 at the head end of the machine is conducted to the pipe 17 through a pipe 25 having a check valve 2 therein to prevent rearward flow of water through said pipe.

27 is a pipe communicating with the water jacket 6 and having an overflow pipe 28 connected to the sewer system or other desired outlet. 29 is a vent pipe communicating with the pipe 27. Pipes 30 and 31 provide means for draining the milk tank 5 and the water jacket 6 respectively, said pipes being normally closed by any suitable means.

In the operation of the machine when used as a pasteurizer, milk or cream having been introduced into the vat, the water supply valve 20 is opened to admit water to fill the passages of the machine, when said water valve may be closed. Steam is now admitted through both the pipes 16 and 23 to heat the water and cause a circulation thereof through the rotary spiral 8, pipe 22, water jacket 6, and pipe 25, so that the milk in the vat will be quickly brought to a pasteurizing temperature. It will be noted that in addition to the heating action of the tempering coil 8, the water jacket 6 provides a very large heating space, since the bottom of the milk tank 5 is seated in the water of said jacket.

In Fig. 3 I have shown an effective combination of a vat into which milk may be poured from cans or the like, and three pasteurizing machines (which may be of the type hereinbefore described), whereby milk may be continuously supplied from the machines, considered as a whole, to a continuous cooler, the latter delivering the milk without interruption to one or more fillers and cappers. Milk from the dump vat A may be forced by a pump B through a main pipe C and branch pipes D to the bank of pasteurizing machines E. The milk flows from the machines E through branch pipes F and a main pipe G to a continuous cooler H, of any suitable type. From the cooler H the milk is conveyed through pipes I to one or more combined filling and capping machines J. Preferably the pasteurizers E are located at a higher level than the cooler H so that the milk will flow by gravity from the former to the latter, and likewise the cooler H is positioned at a higher level than the filling and capping machines J for the same purpose. K indicates a stairway leading from the level of the filling and capping machines up to the platform M upon which the continuous cooler is mounted, and L are steps leading from the latter up to the platform N of the pasteurizers. The various parts of the apparatus may be driven by suitable shafts, belts and pulleys indicated by the letter O.

As will be understood the discharge from each of the individual machines E is intermittent. By combining two or more of the machines E in the above manner, the machines may be maintained in successive stages of operation, by means of suitable valves, such as the valves P, Fig. 3, that is to say, one of the machines may be filled, while the contents of a second is being heated and held, and a third is being discharged into the continuous cooler, so that the discharge of milk from the bank of machines E to the cooler may be continuous and milk be constantly delivered to the bottle filling machines. It will be understood that by increasing or decreasing the number of pasteurizers in the series, the capacity of the apparatus, taken as a whole, may be changed to suit the requirements of the particular creamery; also the discharge from the machines E need not be continuous but may be separated by intervals of the desired length, this being controlled by suitable valves P as conditions may dictate.

If it be desired to heat, hold and cool the milk all in the same machine, steam and water will be supplied at first as above explained, and then the steam will be entirely shut off and cold water or other suitable cooling medium admitted to the machine to lower the temperature of the milk to the desired point.

It will be seen that the steam from the supply pipes 16 and 23 never comes in contact with the milk tank 5, the steam first being injected into the water and thus forcing the heating water into the spiral 8, and finally into the water jacket 6. In this way any liability of scorching or burning of the milk is absolutely obviated.

When it is desired to sterilize the machine before placing milk therein, steam may be admitted from the pipes 16 and 23 to the machine to bring the walls of the milk tank and the entire interior of the vat to a temperature sufficient to thoroughly sterilize the vat.

While the embodiment of my invention which I have herein shown and described is the preferred form thereof, I recognize that various modifications within the scope of my invention may be made, wherefore I do not limit myself to the details herein set forth.

I claim as my invention:

1. In a machine of the class described, the combination of a horizontally arranged vat containing a milk chamber and a water jacket for the bottom of said chamber, a hollow spiral tempering member mounted within said milk chamber for rotation on a horizontal axis, pipes connecting the opposite ends of said spiral member with the adjacent ends of said water jacket, a steam supply pipe and a water pipe communicating with the first mentioned pipes at one end of the machine, said steam pipe being adapted to inject a jet of steam into the other pipes to heat the water and cause a circulation thereof from end to end through the spiral member in one direction and through the pipes at one end of the machine, thence from end to end of said water jacket in the opposite direction and through the pipes at the opposite end of the machine.

2. In combination, a bank of batch pasteurizers each comprising a vat having therein a rotary spiral tempering member, means for supplying heating fluid to said tempering member, a supply pipe having branches arranged to convey milk to all of said pasteurizers, a continuous cooler, a pipe discharging into said cooler and having inlet branches connected with the discharge from the respective pasteurizers, and means whereby said pasteurizers may be maintained in different successive stages of operation with relation to each other for the purpose described.

3. In combination, a bank of batch pasteurizers each comprising a vat having therein a rotary spiral tempering member, means for supplying heating fluid to said tempering member, a supply pipe having branches arranged to convey milk to all of said pasteurizers, a continuous cooler, a pipe discharging into said cooler and having inlet branches connected with the discharge from the respective pasteurizers, each of the latter being constructed to independently perform the heating and holding operation, and means whereby said pasteurizers may be maintained in different successive stages of operation with relation to each other for the purpose described.

In testimony whereof I affix my signature in presence of two witnesses.

THEODORE L. VALERIUS.

Witnesses:
J. F. SCHREINER,
R. J. SMITH.

Copies of this patent may be obtained for five cents each, by addressing the "Commissioner of Patents, Washington, D. C."